(No Model.)
D. HUMPHREYS.
GALVANIC BATTERY.
No. 390,674. Patented Oct. 9, 1888.
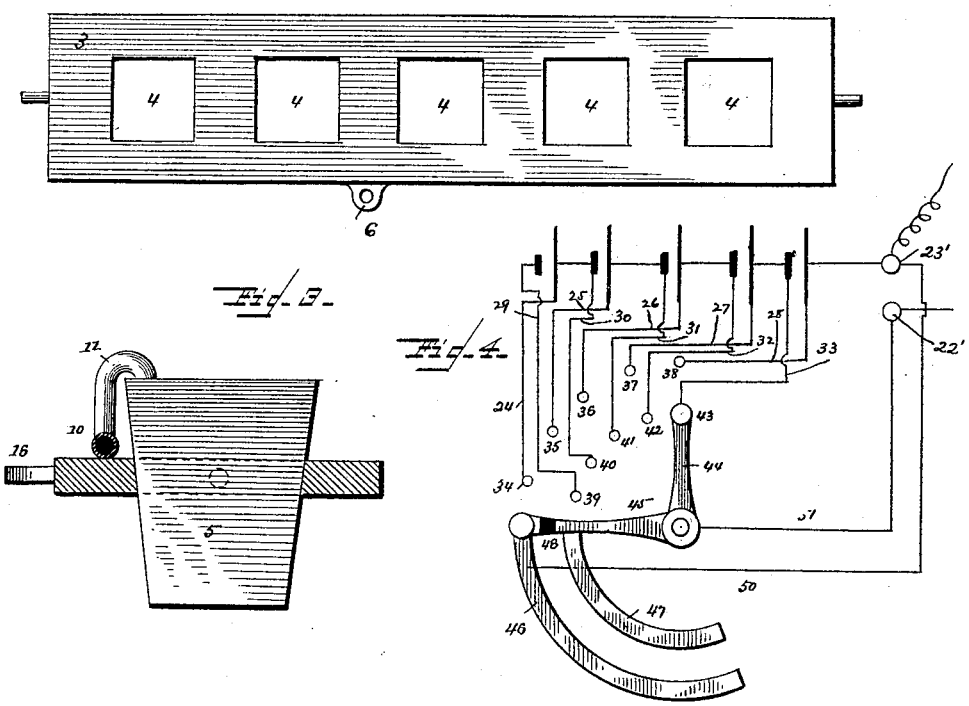

UNITED STATES PATENT OFFICE.

DAVID HUMPHREYS, OF CINCINNATI, OHIO.

GALVANIC BATTERY.

SPECIFICATION forming part of Letters Patent No. 390,674, dated October 9, 1888.

Application filed March 6, 1888. Serial No. 266,307. (No model.)

*To all whom it may concern:*

Be it known that I, DAVID HUMPHREYS, a citizen of the United States, residing at Cincinnati, in the county of Hamilton and State of Ohio, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to galvanic batteries of that type in which polarization is reduced or retarded by mechanical action, the polarizing-gas being dislodged by agitation and a new surface of the excitant or depolarizer being constantly brought into contact with the negative or conducting electrode. In batteries of this kind as heretofore constructed either the elements themselves have been rotated so as to bring them alternately into the air and excitant, so that the polarizing-gas might be dissipated by admixture with the external atmosphere, or the liquid has been provided with special agitators. The efficiency of these batteries has been reduced by reason of the small bubbles of gas being covered with the exciting-liquid, so that they cannot readily escape and mix with the surrounding air. The gas is therefore carried back into the liquid, and its polarizing influence on the battery is only reduced by a small amount. I provide for a thorough agitation of the solution by rocking the entire cell, so as to dislodge the bubbles of gas and keep the fluid constantly in motion to keep a fresh depolarizing-film in contact with the negative electrodes.

My invention embodies certain features of construction, which will hereinafter be clearly set forth in this specification, and then definitely indicated in the appended claims.

In the accompanying drawings, which illustrate my invention, Figure 1 is an elevation of a system embodying my invention. Fig. 2 is a plan of the working-frame for supporting the cells. Fig. 3 is a cross-section of this frame, showing a cell supported therein. Fig. 4 is a diagram of switches and circuits for coupling the cells in various relations.

Upon suitable supports, 1 2, is trunnioned an iron frame, 3. (See Figs. 1 and 2.) The frame is provided with a series of openings, 4 4 4 4 4, adapted to admit battery-cells 5 5 5 5 5. These cells or jars are shown tapered through any irregularity of contour which would enable them to be supported in the frame would serve. The openings in the frame are made of such a size that when the cells are in position and have their electrodes in position, and are supplied with the proper amount of excitant, or, in other words, when the series of batteries are in operation, the entire organization will be almost balanced on the trunnions of the frame. A pipe, 10, is mounted on the frame, and branch pipes 11 11 11 11 11 lead from this pipe to the several cells, being bent over the edge of the cells, as shown. This pipe 11 is in communication with a reservoir, 13, through a flexible tube, 12. A cock, 14, controls the flow of liquid from the reservoir. The reservoir is provided with a gage, 15, to indicate the height of the contained liquid, and an induction-opening, as shown, by which it may be filled from time to time. This reservoir is placed at a sufficient elevation to force its liquid into the cells, no matter what the level in the reservoir may be.

Electrodes 16 17, of zinc and carbon, are provided for each cell, two carbon electrodes corresponding to each zinc to increase the negative surface. The electrodes are all mounted on a common support, 18, and can be raised out of the cells or lowered into the same by means of wires or cords 19 20 and a windlass, 21. A cap or cover, 22, is mounted on the under side of support 18 and incloses a gasket or washer, 23, so that when the elements are lowered into the cells a fluid-tight joint is produced at the edge of the cells.

The frame 3 is provided with a lug, 6. A cord, 7, connects this lug with a crank-arm, 8, of a motor, 9. This motor may be mechanical or of any other suitable character, the only desideratum being that it should have sufficient power to give a reciprocating or rocking movement to the cells.

The batteries are provided with binding-posts 22' 23' and switches, by means of which they may be connected in series or multiple arc, or part in series and part in multiple arc, so as to commutate the current to any desired strength within the compass of the battery. Such a switching arrangement is shown in Fig. 4, in which the carbons are connected by conductors 24 25 26 27 28 with a series of contacts, 34 35 36 37 38, and the zincs are connected by conductors 29 30 31 32 33 with contacts 39, 40, 41, 42, and 43. These contacts are arranged in circumferential rows. The inner row is swept by a switch, 44, which is connected at its pivotal point with one of the binding-posts, 22', of the battery by means of a conductor, 51. Another switch is pivoted on the same post as 44. The arm 45 of the second switch carries two metallic arcs or bridges, 46 47, insulated from each other by an insulating-joint, 48, in arm 45. A conductor, 50, connects bridge 46 with binding-post 23'. From this organization it will be evident that by putting switch 44 on a desired contact any number of the cells may be thrown in series into the external circuit, connecting with binding-posts 22' 23', and that by moving the switch-arm 45 to any desired contact any number of the cells may be connected in multiple arc, so as to discharge into said circuit, and that by bringing the two switch-arms upon adjoining contacts, part of the battery-cells will be in series and part in multiple arc. This switch is placed upon the support 18. (It is omitted from Fig. 1 to avoid confusion.) The operation of the system will now be understood. The reservoir is charged with any suitable battery-excitant—as, for example, a preparation of water, bichromate of potash, and sulphuric acid. The height of the excitant in the reservoir will be shown by the gage. A proper quantity of the excitant is admitted to the cells by turning cock 14. The electrodes are lowered into position and the motor set in operation. By reason of the batteries being almost balanced but little power need be exerted by the motor to give the necessary rocking motion. This rocking motion keeps the excitant constantly agitated and dislodges any bubbles of hydrogen which may accumulate on the carbon electrodes. Besides this, another important function is subserved.

It is well known that all bichromate solutions are very active depolarizers for a brief interval of time, and then decline very rapidly in depolarizing-power. This decline of power is due to two causes: first, the formation of chrome-alum, which greatly increases the resistance of the solution; and, second, the reduction of the solution in the immediate neighborhood of the carbon electrodes by the hydrogen-abstracting oxygen and reducing the compound to a lower and more stable chromium compound. This reduction first occurs in the liquid immediately surrounding the carbon, and unless some method of agitating the liquid is provided the current strength will fall very low when this film has been robbed of such proportion of oxygen as it will readily give up, although there may be a large bulk of excitant present in the cell, which would maintain the current strength if it were brought into contact with the polarizing-surface. By rocking the cells the entire body of the excitant is agitated, and a continually-changing film of liquid is brought into contact with the carbon. In other words, the whole body of the excitant is made to contribute to the depolarizing effort, and the whole body of the excitant is uniformly reduced. The packing around the cells prevents the liquid from spilling and adapts the system for use on cars or other vehicles. When the current strength falls below the required degree, the spent excitant is drawn off through cocks 49, and a supply of fresh fluid is admitted.

I desire to have it understood that I do not restrict myself to the specific details of structure set forth.

Having thus described my invention, what I claim as new, and desire to secure by Letters Patent, is—

1. The combination of a galvanic battery, a support on which it may rock, and a motor for rocking said battery, whereby the polarizing-gas is dislodged and polarization is reduced.

2. The combination of a battery, a support on which it may rock, a fluid-tight cover for said battery, means for admitting and withdrawing the excitant from said battery, and a motor for rocking said battery to agitate the excitant and reduce polarization.

3. The combination of a series of battery-cells, a support on which said cells may rock, a common supply-pipe to feed an excitant to said cells, a reservoir for this excitant communicating with said supply-pipe, a cock to control supply from said reservoir, and a motor for rocking the cells.

4. The combination of a trunnioned frame, a battery supported on said frame, and a motor for rocking said frame.

5. The combination of a trunnioned frame, a series of batteries supported on said frame, a fluid-tight cover for said batteries, a motor for rocking the frame, a reservoir for the excitant, pipe connecting the reservoir and batteries, and exhaust-pipes and cocks for controlling the supply and exhaust.

6. The combination of a trunnioned frame, battery-cells supported therein, electrodes and frame carrying same, a windlass for raising and lowering the electrodes into the cells, and a motor for rocking the trunnioned frame.

7. The combination of a trunnioned frame, a battery supported in said frame almost balanced, and a motor for rocking the frame.

In testimony whereof I affix my signature in presence of two witnesses.

DAVID HUMPHREYS.

Witnesses:
 THOS. E. WOODS,
 ROBT. H. READ.